United States Patent
Dalziel et al.

(10) Patent No.: US 9,206,802 B2
(45) Date of Patent: Dec. 8, 2015

(54) PUMP OR TURBINE FOR INCOMPRESSIBLE FLUIDS

(75) Inventors: Lindsay Bruce Dalziel, Auckland (NZ); John Layne, Auckland (NZ); Benno Frank Smit, Auckland (NZ)

(73) Assignee: SWASHPUMP TECHNOLOGIES LIMITED, Auckland (NZ)

( * ) Notice: Subject to any disclaimer, the term of this patent is extended or adjusted under 35 U.S.C. 154(b) by 221 days.

(21) Appl. No.: 13/518,043

(22) PCT Filed: Apr. 24, 2010

(86) PCT No.: PCT/NZ2010/000081
§ 371 (c)(1),
(2), (4) Date: Jun. 21, 2012

(87) PCT Pub. No.: WO2011/078696
PCT Pub. Date: Jun. 30, 2011

(65) Prior Publication Data
US 2013/0011287 A1 Jan. 10, 2013

(30) Foreign Application Priority Data
Dec. 24, 2009 (NZ) ......................... 582354

(51) Int. Cl.
*F04C 9/00* (2006.01)
*F01C 21/02* (2006.01)
(Continued)

(52) U.S. Cl.
CPC .............. *F04C 9/005* (2013.01); *F01C 21/02* (2013.01); *F04C 13/008* (2013.01); *F04C 15/0073* (2013.01); *F04C 2230/91* (2013.01);
(Continued)

(58) Field of Classification Search
CPC .......... F01C 9/005; F01C 21/02; F04C 9/005; F04C 13/008; F04C 15/0073; F04C 2230/91; F04C 2240/51; F16F 7/08; F05C 2225/00; F05C 2201/0442; F16C 11/0671
USPC .......................... 418/50, 51, 52, 53, 195, 68; 29/898.044; 403/134
See application file for complete search history.

(56) References Cited

U.S. PATENT DOCUMENTS

| | | | |
|---|---|---|---|
| 1,489,416 A * | 4/1924 | Anderson et al. | 418/57 |
| 1,638,183 A * | 8/1927 | Bylger | 418/51 |
| 2,887,059 A | 5/1959 | Cornelius | |

(Continued)

FOREIGN PATENT DOCUMENTS

| | | |
|---|---|---|
| DE | 59696 | 11/1891 |
| GB | 557673 | 11/1943 |

(Continued)

OTHER PUBLICATIONS

International Search Report—PCT/NZ2010/000081—Oct. 25, 2011.

*Primary Examiner* — Thai Ba Trieu
*Assistant Examiner* — Thomas Olszewski
(74) *Attorney, Agent, or Firm* — Young & Thompson

(57) ABSTRACT

A rotatable drive shaft in the swash pump or turbine for liquids is supported by one bearing at each end. An integrated motor or dynamo uses the same two bearings. The compound first bearing supports a slanted section of the drive shaft placed inside the inner swash sphere, and transfers rotational power to the attached nutatable swash plate. The second bearing confines rotation of the drive shaft in a defined axis. Either one of the bearings is made to prevent axial movement of the drive shaft, preventing swash pump misalignment. A resilient drive, and an immersed pump are described.

10 Claims, 6 Drawing Sheets

Figure 1:
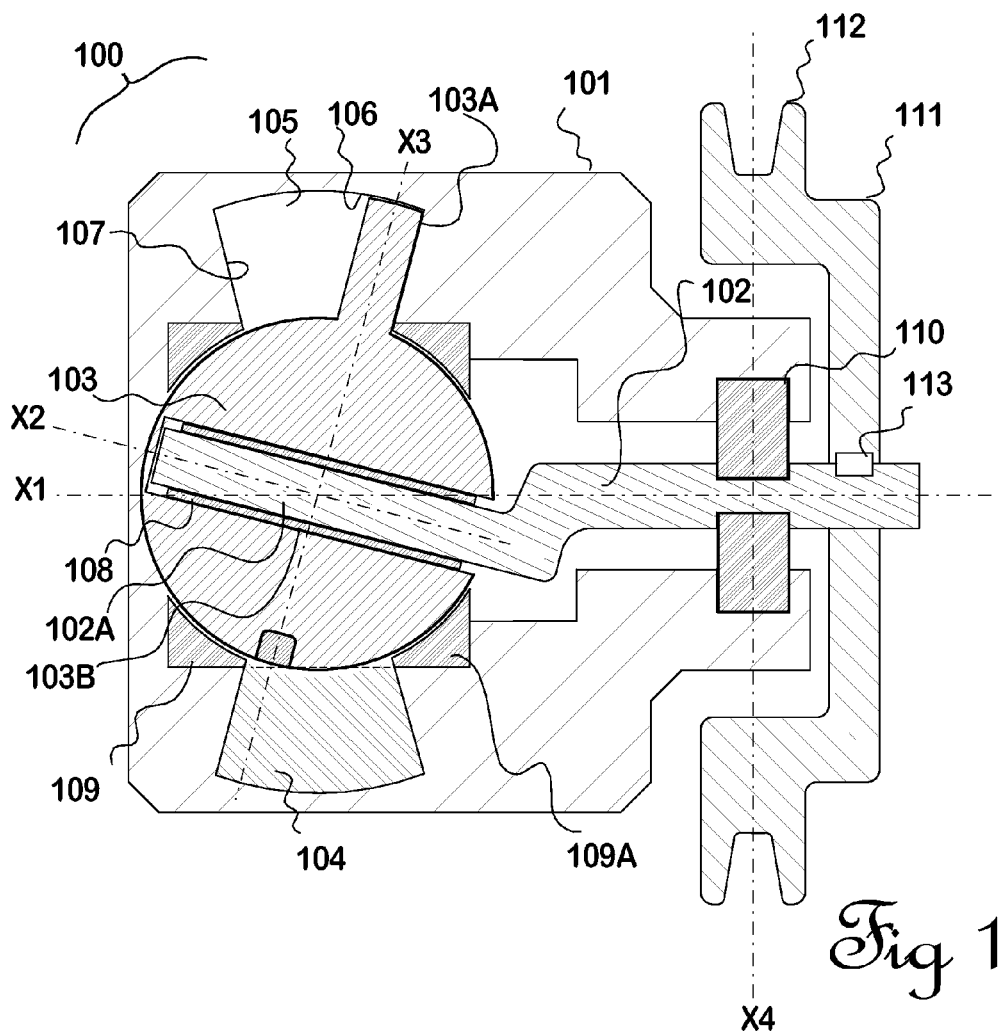

(51) Int. Cl.
  *F04C 13/00* (2006.01)
  *F04C 15/00* (2006.01)
(52) U.S. Cl.
  CPC ..... *F04C2240/51* (2013.01); *F05C 2201/0442* (2013.01); *F05C 2225/00* (2013.01)

(56) References Cited

U.S. PATENT DOCUMENTS

| | | | |
|---|---|---|---|
| 3,357,728 A | * 12/1967 | Melton et al. | 403/134 |
| 3,485,218 A | * 12/1969 | Clarke | 418/53 |
| 3,942,384 A | 3/1976 | Parker | |
| 3,969,803 A | * 7/1976 | McCloskey | 29/898.044 |
| 4,919,601 A | * 4/1990 | Kim | 418/51 |
| 5,026,253 A | * 6/1991 | Borger | 415/229 |
| 5,242,281 A | * 9/1993 | Hartley et al. | 418/53 |
| 2001/0009644 A1 | 7/2001 | Fujii et al. | |
| 2011/0200474 A1 | * 8/2011 | Dalziel et al. | 418/51 |

FOREIGN PATENT DOCUMENTS

| | | |
|---|---|---|
| GB | 874838 | 8/1961 |
| JP | 58-18585 | 2/1983 |

* cited by examiner

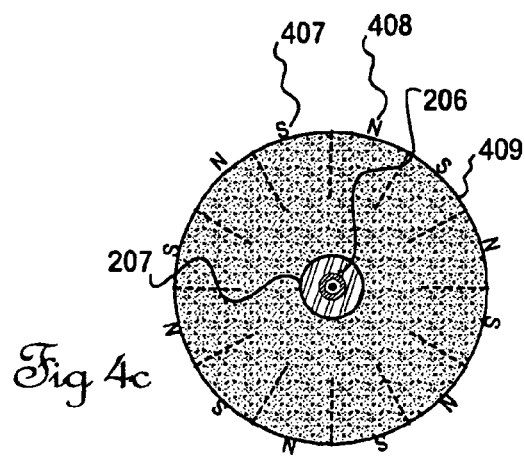

PUMP OR TURBINE FOR INCOMPRESSIBLE FLUIDS

FIELD

This invention relates in general to a pump or turbine using a nutatable swash plate; and in particular to a swash pump adapted for pumping a liquid, or a swash turbine adapted for being rotated by a liquid passing through the turbine. Flow meters may also use a nutatable swash plate.

DEFINITIONS

The reader should bear in mind that the following description makes reference in the main to pumps. The device can be used in reverse as a turbine or hydraulic motor simply by forcing a liquid through the device using a pressure difference between one port and the other, and therefore the word "pump" should be taken to refer to "pump or turbine" throughout. The electric motor described herein is equally capable of functioning as generators.

"Common drive shaft" refers to a drive shaft in the swash pump or turbine, consisting of a straight section, and an offset section, leading to a slanted section; all lying in the same plane. The slanted section is supported by cylindrical bearing means inside the inner swash sphere.

"Compound bearing" refers to an apparatus comprised of a one bearing inside another. In this specification the inner swash sphere and the supporting spherical bearings is a first part of a compound bearing; a journal bearing inside the swash sphere is the second part. "Cone plate" refers to each of a pair of truncated shallow cone-shaped plates having a fixed, radially symmetrical, sloping inner surface facing the swash plate with which it comprises a movable line-shaped seal. The plates may comprise part of the pump or turbine housing or be insets.

"Congruent" means "coinciding exactly when superimposed".

"Congruent Point" is a point where, during use, both nutation and rotation occur simultaneously at the point of axial congruence in a swash pump during use. The congruent point is located where (a) the axis of the straight section of the common drive shaft (if produced) intersects the axis of the slant section of the common drive shaft, and (b) the centre of the inner swash sphere intersects point (a). Or, (b) may be defined as the point where the axis of the trunnion bearing (if produced) always intersects the point (a). When the swash pump (or turbine) is in use, both axes of the common drive shaft rotate and the axis of the trunnion bearing nutates. The significance of this concept is explained in the text and in FIG. 1.

"Engineering plastics material" as used herein refers to advanced inorganic compounds, alloys and mixtures capable of being formed to close tolerances. They are tough, strong, and suitable for sliding seals, having low friction and low wear. Such plastics are typically alloys comprised of a base plastic (55 to 70% ratio) selected from a range exemplified by polyethyletherketone (PEEK), polyphenylenesulphide (PPS) preferred for the trunnion, or polyphthalamide (PPA) (currently used on the other sliding surfaces) alloyed with polytetrafluorethane (PTFE), carbon, carbon fibres, and sometimes silicon, and are injection mouldable. Commercially available examples include "Fortron 7140A4 (Polyplastics, Japan), "UCL-4036 HS" (Sabic, Saudi Arabia), and those used in "DU" plain bearings, or equivalents as are well-known to those skilled in the art.

"Inner swash sphere" is the sphere that supports the firmly attached and rigid swash plate, and which moves with the swash plate within the fixed housing. The swash plate is located between the cone plates and makes contact or near-contact with them at two diametrically opposite movable sealing lines as a consequence of pump or turbine construction. In the present invention, the common drive shaft is slanted at the same angle as that of the cone plates (the "slant angle"), as it penetrates the inner swash sphere and is journalled therein. The inner swash sphere is concentric within an abbreviated outer swash sphere, typically incorporated in the pump body and located above the gap between the cone plates and beyond the swash plate. A slidable seal may be provided between the outer edge of the swash plate and the inner aspect of the outer swash sphere which usually comprises part of the housing. The inner swash sphere and swash plate move in a nutating movement during use.

"Nutation" refers to the peculiar orbital movement made by a swash plate inside a swash pump. It resembles the wobbling movement of a coin after being dropped obliquely on to a hard flat surface. Truly effective pumping results from nutation where the swash plate makes simultaneous contact with both cone plates at two moving "sealing lines"; one sealing line being 180 degrees apart from the other sealing line, on the opposite side of the plate. In practice, contact may be achieved on one side at any particular moment, while the other side may almost make contact. Each rotatable sealing line rotates about the axis of the swash pump during nutation, advancing towards and past a substantially fixed transverse divider plate, forcing fluid against the divider plate and through an outlet port.

"Pumping chamber". Each pumping chamber is defined by a cone plate and one side of the swash plate, by the outer swash sphere, and by the inner swash sphere, and material may be moved through the pump by the moving sealing line. Both sides of the pumping chamber may be used in parallel for a less pulsatile output, or used separately, by suitable porting arrangements.

"Trunnion" refers to a sliding bearing which creates an effective seal between the nutating swash plate and the fixed divider plate that intersects the cone plates and the swash plate. The trunnion bearing has a rotational axis and slides over the divider plate during nutation of the swash plate. The fixed divider plate forms a leading and a trailing barrier for the circumferential pumping chamber and is the barrier against which the liquid becomes pressurised during pumping.

BACKGROUND

Swash pumps, turbines, engines, or flow meters with nutating disks have been known for more than 50 years. The principle has had little commercial success to date, and the existing designs generally exhibit over-engineering or perhaps a lack of understanding, as shown for instance by an oversupply of bearings in the prior art, with attendant disadvantages.

PRIOR ART

One aspect of this invention relates to optimising the bearings used in a swash pump or turbine. Previous designs do not use the assembly that we name the compound bearing to support the shaft transmitting power from the motor. Either physical bearings are placed on each side of a straight drive shaft transfixing the inner swash sphere, or several bearings cantilever a sturdy shaft from one side of the inner swash sphere. For instance, Kim, U.S. Pat. No. 4,919,601 describes a swash pump for liquids or gases in which a bent drive shaft like that of the present application is used. We have reproduced Kim's FIG. 2A drawing (from U.S. Pat. No. 4,919,601) as FIG. 3b, showing two ball bearings in the housing (25) supporting the straight section (16) of the common drive shaft to support the slanted section (17) of the common drive shaft. Kim's two bearings provide a sturdy cantilever mount supporting the drive shaft from one end. This avoids using the inner swash sphere as a shaft support bearing. If the Kim mechanism restrained axial movement of the drive shaft, manufacturing tolerances would lead to misalignment, causing excess friction. Meyer EP 0 55 044 and U.S. Pat. No. 5,482,449 show the bilateral bearings approach in an internal combustion engine; also Ford GB 1103271 Ford U.S. Pat. No. 3,323,466. Cornelius U.S. Pat. No. 2,887,059, Kim, also in U.S. Pat. No. 5,138,993 and Heng, WO93/06371 illustrate cantilevering.

Our earlier patent application, PCT/NZ2009/000198 describes a means for including a resilient component within the drive of the swash pump or turbine which has been again described in the instant specification with respect to an invention in which the inner swash sphere serves as a bearing and as a seal.

Problem to be Solved

To provide a useful swash pump or turbine as a functional unit; preserving the inherent advantages of a swash pump such as a steady output flow and low noise; while reducing avoidable leakages and overcoming at least some of the frictional losses that have been regarded as typical of this type of pump.

Object

The object of this invention may be stated as to provide an improved swash pump or turbine, as a positive displacement pump or turbine for a liquid, or at least to provide the public with a useful choice.

STATEMENT OF INVENTION

In a first broad aspect the invention comprises a swash pump or turbine having an inner swash sphere with an annular swash plate attached thereto and with a central aperture; the plate being contained within an enclosed pumping chamber enclosed on each side by a fixed cone plate having the shape of a shallow cone; enclosed outwardly by the internal surface of a fixed, partial external swash sphere attached to or forming part of a housing of the swash pump or turbine; and enclosed inwardly by the inner swash sphere; a divider plate attached to the housing and intersecting both the pumping chamber and the swash plate lies near an inlet port at one side and an outlet port at the other side of the divider plate; the divider plate separated from the swash plate by a trunnion bearing set into the inner swash sphere and having an axis of rotation; the inner swash sphere is caused, when in use, to move in a nutating manner by rotation of a slanted section of a rotatable common drive shaft inside the central aperture of the inner swash sphere; the common drive shaft having a straight section capable of turning or being turned by an attached wheel; the inner swash sphere thereby being constrained; when the common drive shaft rotates; to move in a nutatory motion, while maintaining a moving sealing line between the swash plate and diametrically opposite cone plates; wherein the common drive shaft of the swash pump or turbine is entirely supported by two bearing means comprising (A) a compound bearing supporting the swash plate; said compound bearing having an outer part comprising the outer surface of the inner swash sphere slidably supported upon two concave part-spherical bearings that are in turn supported in the housing of the swash pump or turbine, together with an inner part comprising journalled bearing means within the central aperture of the inner swash sphere, supporting the slanted section of the drive shaft; and (B) a single bearing means supporting the straight section of the common drive shaft against the housing.

Preferably either one of bearing means (A) or bearing means (B) also includes means for maintaining the common drive shaft in a controlled axial position relative to the housing of the swash pump or turbine in order that a state of congruence at a congruent point where the axis of rotation of the straight section of the common drive shaft and the axis of rotation of the slanted section of the common drive shaft meet at the centre of the inner swash sphere, so that, when in use, loads placed upon the bearings are minimised and so that parallel alignment of the swash plate against the adjoining cone plates at the moving sealing lines is maintained.

More particularly, the bearing means (B) is selected from a range including a deep-groove ball bearing assembly, a self-aligning spherical roller or ball bearing assembly, and a plain journal bearing combined with thrust washers preventing axial movements; said bearing means (B) being capable, when fixed within the housing of the swash pump and fixed to the straight section of the common drive shaft, of maintaining the common drive shaft in a controlled axial position relative to the housing of the swash pump or turbine in order that a state of congruence at the congruent point is maintained.

More particularly, the journalled bearing means included in the compound bearing means (A) is also provided with thrust bearings allowing only a limited axial movement of the slanted section of the drive shaft with respect to the inner swash sphere single bearing means, thereby maintaining the common drive shaft in a controlled axial position relative to the housing of the swash pump or turbine in order that a state of congruence at the congruent point is maintained.

Preferably the second or single bearing means is thereby capable of preventing misalignment of the swash plate with respect to the cone plates; the term "misalignment" being a condition in which the intersection of three geometrical entities; namely (1) the axis of rotation of the straight section of the drive shaft, (if produced) and (2) the axis of rotation of the slanted section of the drive shaft are not congruent with (3) the centre of the inner swash sphere; said misalignment having at least one adverse effect on the efficiency of the lump, specifically effect of rendering the moving sealing line less effective.

Preferably the tolerance of congruence at the congruent point lies within about 0.5 millimeters for a 110 mm diameter swash pump in order to avoid an adverse effect on the efficiency of the pump.

In a related aspect, entity (3) may be replaced by other entities including (3a) the axis of rotation of the trunnion bearing used to provide a bearing between the swash plate and the divider plate, and (3b) a plane passing parallel to the sides and through the central plane of the swash plate.

Preferably the internal bearing of the compound bearing, inside the concentric aperture, comprises either an internal "DU" plastics journal bearing in one or two parts, or needle roller bearings about the slanted section of the common drive shaft. Alternatively the internal bearing is comprised of a plastics-overmoulded end of the slanted section of the drive shaft, machined so as to slidably fit within the concentric aperture.

In one example, an immersible swash pump is mounted upon a fixed support and having a plain journal bearing supporting the straight section of the common drive shaft, a plain journal bearing together with axially defining thrust bearings supporting the slanted section of the common drive shaft, and a coupling means capable of engagement with an axial, rotatable drive shaft; none of the bearing means including rolling elements and all bearing means being exposed to the liquid in which the pump is immersed.

Alternatively, the outer part of the compound bearing means (A) serves also as a sliding seal, capable when in use of sealing around the inner aspect of the pumping chamber despite nutating motion of the inner swash sphere against the two concave part-spherical bearings.

Preferably the outer part of the compound bearing means (A) has a first bearing surface comprised of a selected metal, selected from a range including spheroidal graphite iron, grey iron, steel, and anodised aluminium, slidable against a second, conforming surface of a selected engineering plastics material selected from a range including polyethyletherketone (PEEK), polyphenylenesulphide (PPS) or polyphthalamide (PPA) blended with polytetrafluorethane (PTFE), carbon, carbon fibres, and sometimes silicon.

In one option the inner swash sphere is comprised of metal and the concave ring bearings have at least a surface of engineering plastics material;

Alternatively the inner swash sphere surface is comprised of an engineering plastics material and the concave ring bearings are comprised of a metal. In that option, the inner swash sphere includes an internal frame, coated with a mouldable plastics material having acceptable friction and wear characteristics, machined to prescribed dimensions and finish. Optionally the same construction may be used for the swash plate.

Optionally the entire swash plate consists of at least one plastics material. Indeed, the pump housing could consist of at least one plastics material.

Preferably, rotation of the straight section of the common drive shaft relative to the housing of the swash pump or turbine is either caused by or causes a torque to be transferred from or to a wheel fixedly attached by a hub to the straight section of the common drive shaft and having peripheral coupling means for transmitting or receiving a torque; the wheel having in cross section a depressed centre or bell shape wherein said peripheral coupling means is displaced axially from the hub; allowing the peripheral coupling means to be positioned radially over the single bearing means so that any net reaction force arising from the transfer of the torque to or from the wheel is applied symmetrically over the single bearing means and so that the common drive shaft experiences substantially no sideways moment of force.

Alternatively a vector sum of forces applied by the torque generating means is symmetrically applied through the first or compound bearing means so that no moment of force is transferred along the drive shaft to the second or single bearing means.

Preferred wheels include, without limitation, wheels adapted for friction drive from flat or "V" flexible belts, wheels bearing rubber tyres, wheels adapted for use with toothed belts, wheels bearing sprockets for chain drives, wheels carrying cranks, wheels having eccentric peripheries, wheels carrying gear teeth, wheels carrying vanes or buckets for interacting with moving fluids, and wheels carrying affixed magnetic or electromagnetic devices including magnets and wound coils; any selected one of which is preferably placed symmetrically over the single bearing means.

In a related example, the wheel is provided with an array of magnets facing inwards; each magnet having at least one magnetic pole carrying a magnetic flux emanating therefrom and capable of passing through at least one wound coil mounted upon an enclosed stator thereby comprising a dynamoelectric machine.

Preferably the combination of the swash pump with the dynamoelectric machine comprises an integrated, electrically driven swash pump having only two bearings, namely a compound bearing means and a single bearing means supporting a common drive shaft serving also as a shaft of the dynamoelectric machine.

Alternatively, the combination of the turbine with the dynamoelectric machine comprises an integrated turbine and dynamo having a compound bearing means and a single bearing means supporting a common drive shaft serving also as a shaft of the dynamoelectric machine thereby providing an integrated turbine and dynamo.

In one option, the rim of the wheel is provided with an array of alternating magnetic poles, a magnetic flux from each pole being directed through at least one adjacent wound coil mounted upon a stator thereby comprising a motor or a dynamo; the combination of the swash pump with the motor or dynamo comprising an integrated, electrically driven swash pump or turbine having only two bearings, namely a compound bearing means and a single bearing means supporting a common drive shaft; the straight section of which also comprises a supported shaft of the motor or dynamo.

In another aspect, the common drive shaft is coupled to the swash plate through a unidirectionally resilient linkage; said linkage includes at least one compression spring supported within a slanted section of a modified common drive shaft having a parallel pair of flat sides each having a plane substantially parallel to the plane defined by the axis of rotation of the straight section and the axis of rotation of the slanted section of the common drive shaft; the flat sides being slidably mounted between two parallel sides in a space within an aperture inside an internal part of a journal bearing rotatably supported within the central aperture of the inner swash sphere; the at least one compression spring pushing against internal walls of the space in the direction of the plane of resilience.

In a third broad aspect, a resilient element is included in the coupling between the common drive shaft and the swash plate using a linkage providing a resilient force in one plane but not in a perpendicular plane; said resilient plane being substantially co-planar with the moving contact lines of the contacts between the swash plate and the adjacent cone plates and said opposite, non-resilient plane being substantially perpendicular to the plane of the moving contact lines of the contacts between the swash plate and the adjacent cone plates so that substantially no resilience is offered to the thrust arising from the liquid under pressure.

Preferably the linkage includes compression springs supported within a slant shaft having a parallel pair of flat sides; the flat sides being slidably mounted against two parallel sides having a common orientation within a space inside an internal bearing race rotatably mounted within the inner swash sphere; the compression springs pushing against two internal walls of the space in a direction perpendicular to the plane of the moving contact lines.

Preferred bearing means are capable of allowing a small amount freedom for tilt of the shaft.

Preferred physical restraint means for the bearing means are selected from a range including a stepped shaft, a circlip, or a retaining ring in a machined groove and a fastened collar; together with fastening means capable of clamping the inner rotatable part such as an inner ball race of the bearing in position upon the shaft, together with retaining means within the housing of the pump capable of clamping the outer ball race of the bearing.

In one option, thrust washers are placed at each end of a plain journal bearing and in contact with the beating so that the plain bearing can turn but cannot slide in an axial direction.

PREFERRED EMBODIMENT

The description of the invention to be provided herein is given purely by way of example and is not to be taken in any way as limiting the scope or extent of the invention. The words "comprising" and "including" should not be taken as limiting the scope or range of any description.

DRAWINGS

FIG. 1 diagrammatically illustrates the principles of the present invention in a longitudinal section.

Figure 2A:
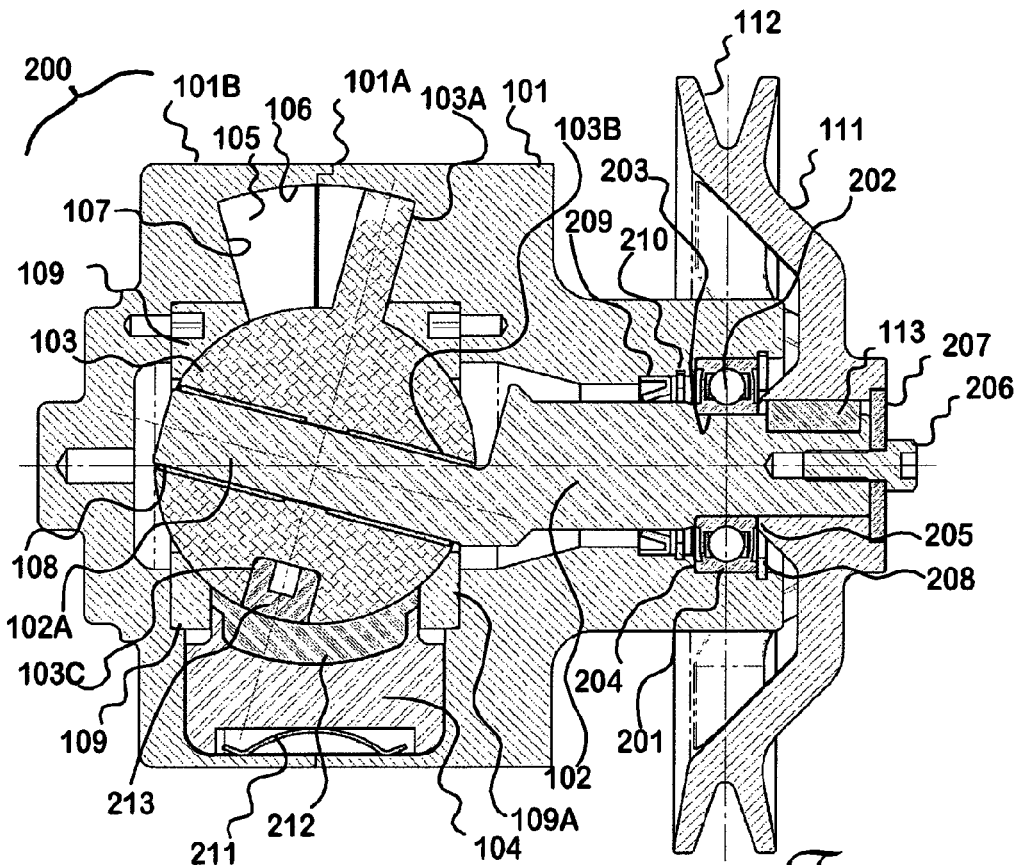
Figure 2B:
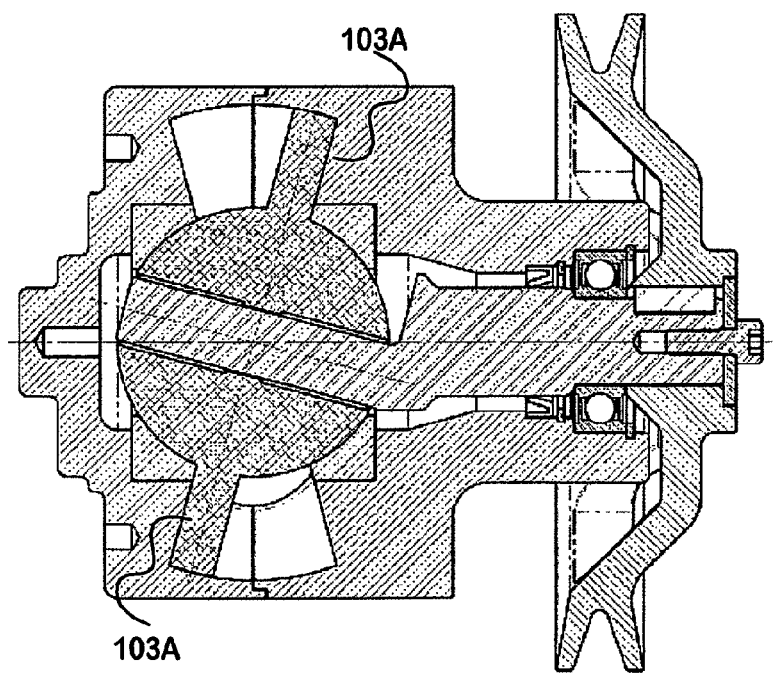

FIG. 2 (as FIG. 2a and FIG. 2b) is a longitudinal section through a complete, working pump according to the present invention. FIG. 2a is a section that passes through the divider plate and the section FIG. 2b passes perpendicular to the divider plate.

Figure 3A:
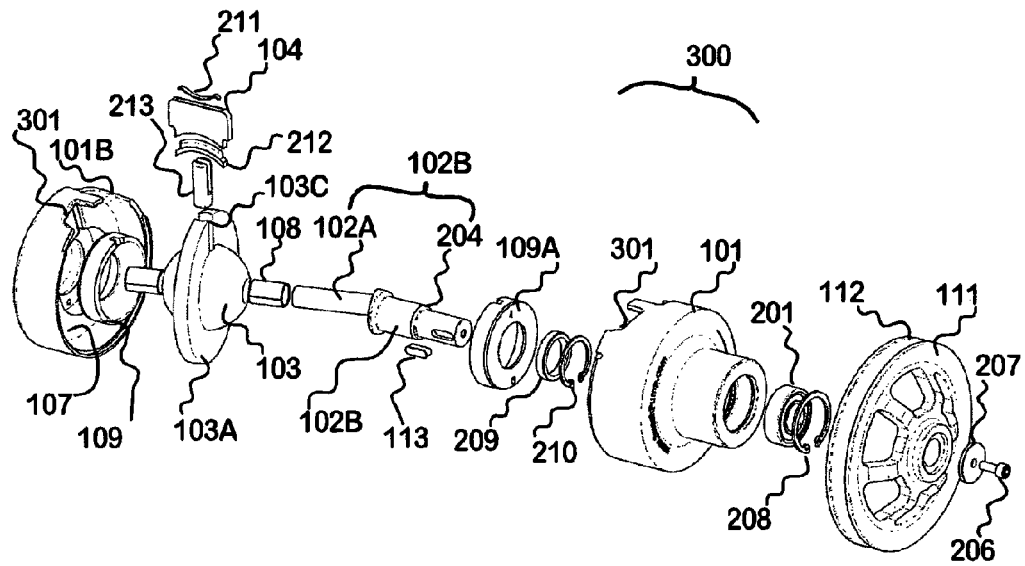
Figure 3B:
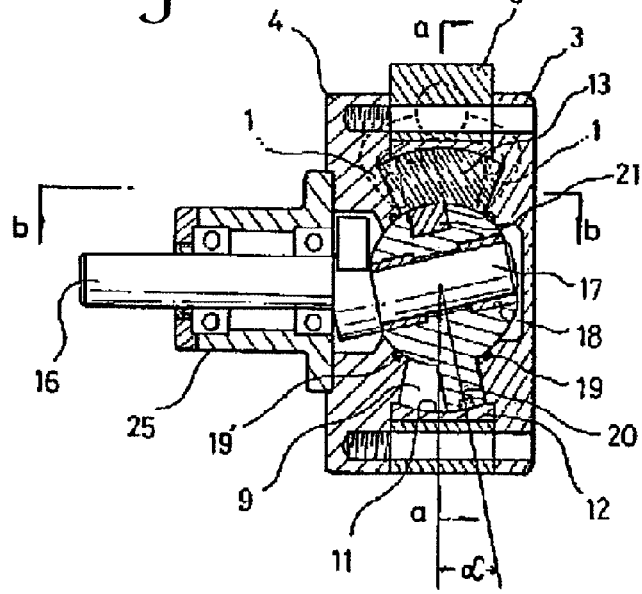

FIG. 3: (as 3a and 3b). FIG. 3a is an isometric exploded view of the working form of FIG. 2; though with the divider to the top. FIG. 3b is a Prior Art drawing taken from Kim, U.S. Pat. No. 4,919,601 where it is labelled "FIG. 2".

Figures 4A, 4B:
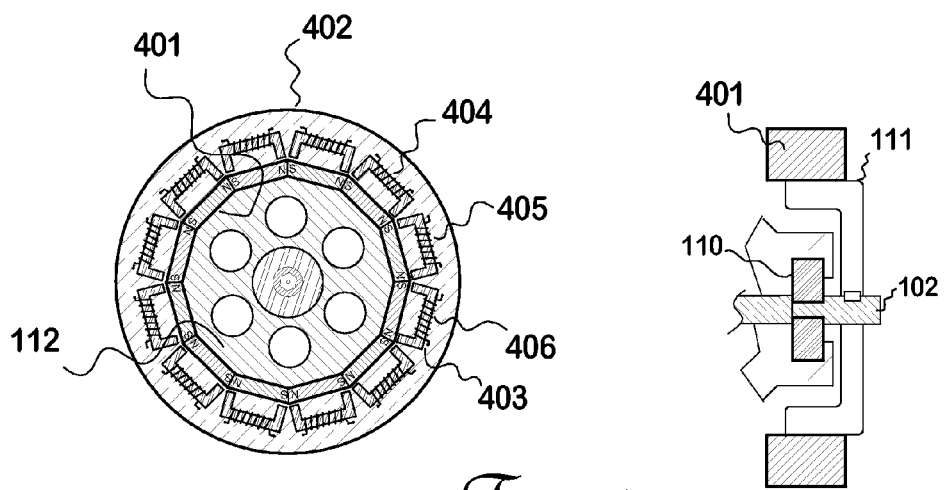

FIG. 4: (as FIGS. 4a, 4b and 4c) is a diagram of an integrated motor constructed upon the swash pump; a rotor in place of the pulley. (Alternatively, this drawing may be interpreted as an integrated dynamo constructed upon a swash turbine). FIG. 4c shows a single ferrite wheel permanently magnetised with a number of poles.

Figure 5:
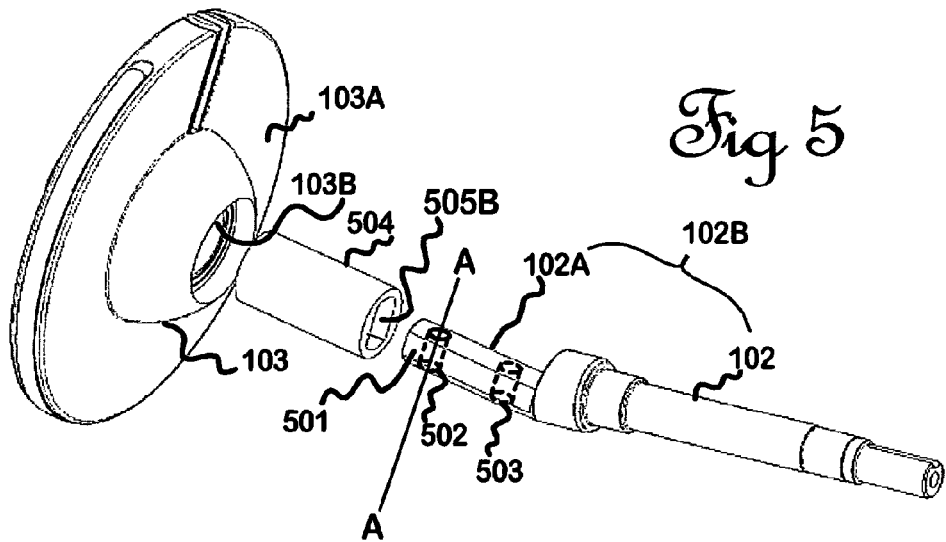

FIG. 5: shows a swash pump according to the present invention, including a resilient coupling between the slant shaft and the inner swash sphere.

Figure 6:
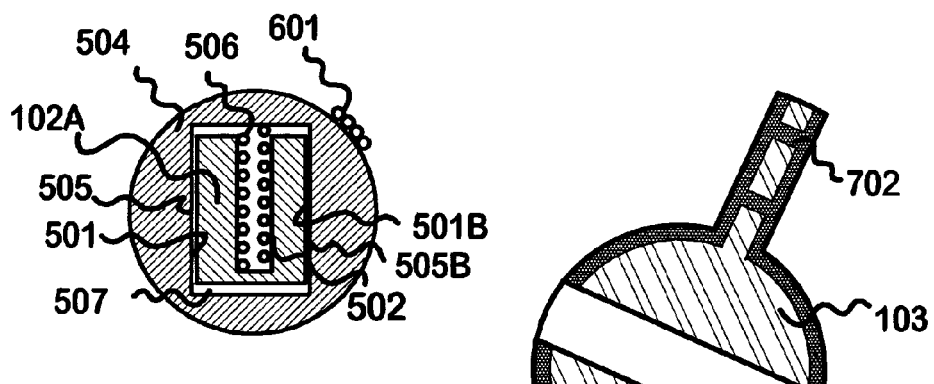

FIG. 6: shows details of a spring mounting used in FIG. 5.

Figure 7:
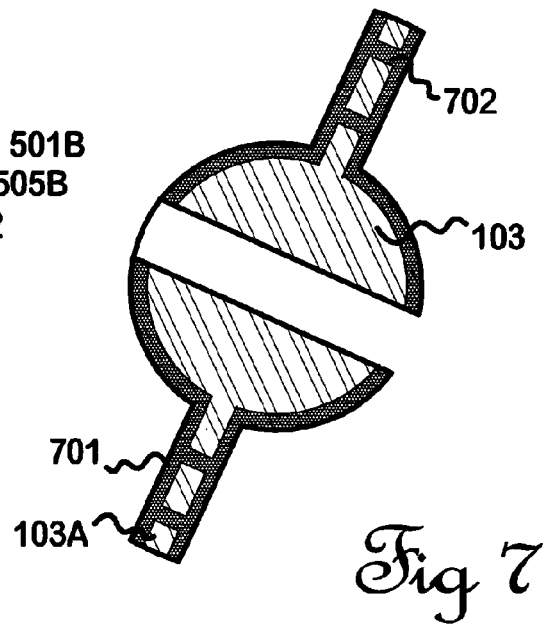

FIG. 7: shows an overmoulded swash plate and inner swash sphere, using an engineering plastics material.

Figure 8:
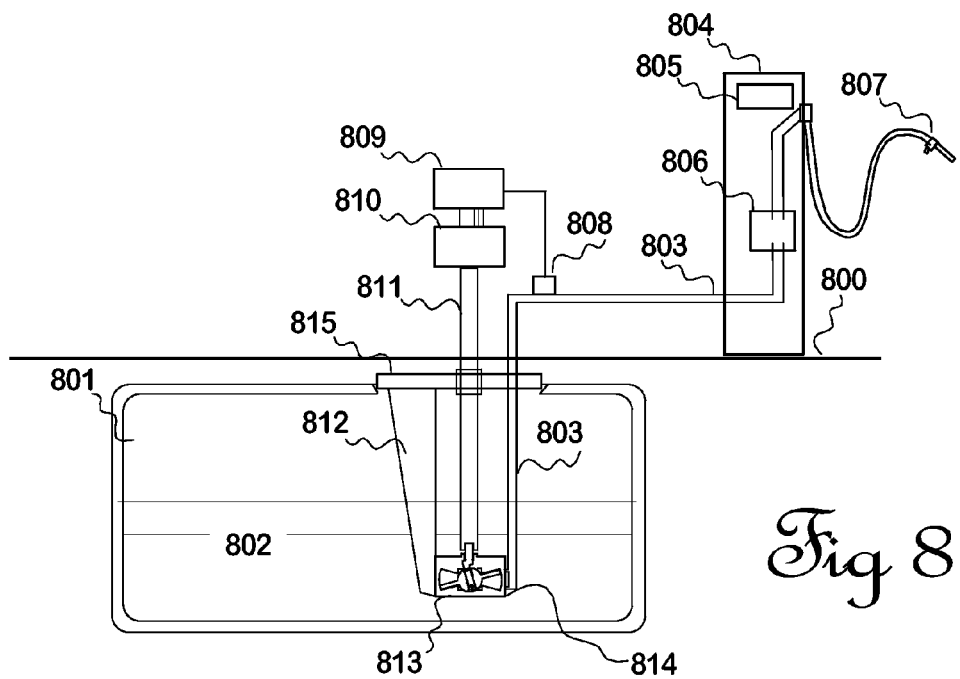

FIG. 8: Diagram showing a submersible pump within an underground storage tank near a fuel dispenser.

Figure 9:
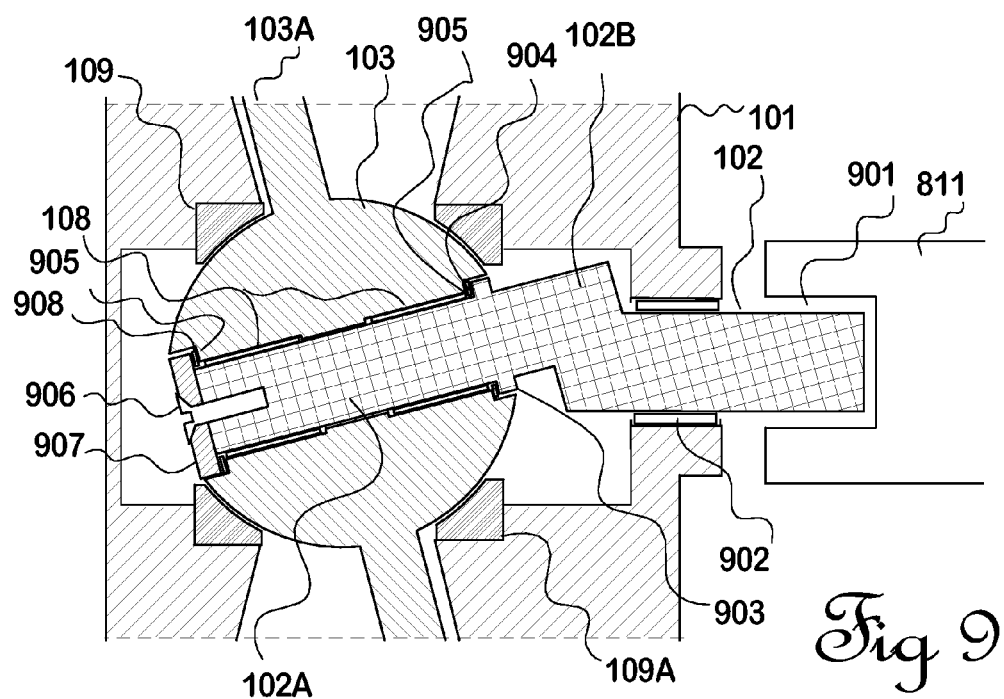

FIG. 9: Diagram (enlargement from the preceding diagram) showing a swash pump having a set of thrust bearings capable of preventing axial motion of the common drive shaft through the inner swash sphere.

FIG. 10: Diagram showing a set of thrust washers preventing axial movement of the straight section of the common drive shaft.

INTRODUCTION

This invention relates to supporting a swash pump or turbine common drive shaft on just two bearings; a compound bearing (bearing means A) over the slanted section of the common drive shaft and a journal bearing (bearing means B) over the straight section of the common drive shaft. A remedy for a hitherto undescribed shaft location problem found in many swash pumps has permitted this advance to be industrially applied.

Explanation:

A swash pump according to the current design may be considered as being comprised of three inter-relating parts each intrinsically having a rigid shape. These are: (A) the one-piece common drive shaft including a straight section, an offset, and a slanted section; (B) the one-piece combination of the swash plate with the inner swash sphere; and (C) the pump housing including (C1) the cone plate surfaces to be brought up against the swash plate sides at the sealing lines, (C2) the sliding bearing surfaces that conform to the exterior of the inner swash sphere which allow nutating movement, and (C3) the bearing for supporting the straight section of the common drive shaft while allowing shaft rotation. The C1, C2 C3 parts are rigidly held together within C as a single housing assembly.

When these three parts are assembled into a swash pump; including bearings such that intended rotation and nutation can be made to occur, there is little freedom for the inter-relating parts to change their positional loci with respect to one another. Ideally the geometrical properties of the common drive shaft and pump components satisfy the requirement of the "congruent point" as previously defined. If this condition does not occur, extra and directional loads are imposed on one or more of the bearings, and the seal is less effective, as described below. The inner swash sphere is inherently located with little if any play in relation to the concave surfaces of the supporting bearings, and the two movable sealing lines between the swash plate and the cone plates are incapable of forming more than a contact. The swash sphere bearing and in particular both sealing lines are at significant distances from the bearing between the slanted section of the drive shaft and the aperture passing into the inner swash sphere, which distances comprise a lever arm for potential exertion of a torque about that bearing.

It is possible to impose axial movement on the common drive shaft so that the slanted section of the drive shaft is driven either into or out of the inner swash sphere. Such a movement tends to displace the inner swash sphere in a direction parallel to a plane shared by the axis of the slanted and straight sections of the drive shaft. The consequent force applies an extra unidirectional rotating radial load on the bearing supporting the inner swash sphere. Reaction to the force tends to deflect the slanted end of the common drive shaft sideways. If the reaction force succeeds in causing sideways deflection, the parallel surface relationship that was created at the time of manufacture between the swash plate and the cone plates at the moving sealing lines is disturbed and so the seal effectiveness worsens. Assuming that the angle of the slant on the shaft is the typical 15 degrees; (the sine of 15 degrees=0.26), there is relatively little direct reaction preventing the imposed axial movement yet there is a notable multiplication of the axial force as applied to the inner swash sphere, theoretically by 1/0.26 or 3.86. Such forces place undue and unnecessary strain on the compound bearing comprising the sliding bearing outside the inner swash sphere and in particular on the journal bearing inside the inner swash sphere, and may cause angular displacement of the inner swash sphere and swash plate. Both effects reduce the efficiency of the pump.

Therefore the two-bearing pumps described in this specification preferably but do not essentially include physical means for restraining the common drive shaft from excessive axial movement. The shaft is preferably held in a position ensuring congruence; minimising bearing loads and optimising sealing. These two-bearing pumps will work without axial restraint of the common drive shaft, but they work better if axial movement is closely controlled.

We shall describe two Examples. In Example 1, the straight section of the common drive shaft is prevented from making axial movements, so that the slanted section of the shaft cannot then force the inner swash sphere into assuming a nutating angle for which it was not designed. Then, in Example 2, the slanted section of the common drive shaft is prevented from making axial movements, more directly preventing the inner swash sphere from altering the required angle. In both Examples, the congruent point is preserved to within an accepted tolerance.

Example 1

This swash pump is optimised for pumping liquids. An example application is for pumping hydrocarbon fuels into a vehicle tank, from a fuel dispenser. The invention may instead be used as a turbine or hydraulic motor or hydraulic actuator. An internal combustion engine is also made more feasible. The present invention demonstrates a swash pump having a rotatable drive shaft supported by one bearing means at or near each end. One of the two bearing means is a compound bearing which name we use to refer to an apparatus comprised of a journal bearing symmetrically placed inside a spherical bearing which together serves to transfer power to the nutating swash plate, and provides a fixed congruent point, a concept to be described fully later in this section, while the other bearing is a conventional bearing allowing rotation only of the drive shaft about a fixed rotation axis.

This Example restricts axial movement of the common drive shaft, as previously described, by means of a selected conventional bearing allowing rotation only of the drive shaft about a fixed rotation axis and supporting the straight section of the common drive shaft, while the slanted section is permitted to move axially within the inner swash sphere, and rotate therein. In FIG. 1, the conventional bearing is shown diagrammatically as a collar of solid material, The gap between the inner swash sphere and the supporting concave bearings on which it slides is exaggerated for clarity. FIG. 2 shows an actual bearing and corresponding locating means.

The rotatable drive shaft 102 has a offset bend about midway along the shaft. The drive shaft is described herein as having a straight section joined at a specified angle and with a specific offset to a slanted section 102A, which engages with the swash plate support. For pumping, rotation of the drive shaft is caused by a torque applied to the straight section of the shaft. Rotation of the slanted section inside the compound bearing, made up of a plain bearing 108 inside the spherical bearing which comprises the inner swash sphere 103 with concave spherical bearings 109 and 109A, gives rise to the required nutating movement of the attached swash plate 103A, which is externally constrained by the divider plate so it cannot rotate. The swash plate is fixed in a plane normal to the axis of the plain bearing inside the sphere. The constraint against rotation comprises a divider plate 104 fixed to the housing and crossing a circumferential pumping space 105 inside the housing 101; also intersecting the swash plate. There is a port for connection to pipes on each side of the divider plate. The two pumping chambers may be used separately or in parallel. The pumping space 105 of such a swash pump has a cone plate 107 on each side; comprising either a formed wall of the housing, a machined overmoulding, or an insert; angled and positioned with respect to the swash plate thickness so that the rotating line of contact between the swash plate and the cone plate performs as a moving seal. The gap width between the two should always be small and the two surfaces at the sealing lines should be substantially parallel. That condition can be realised by precise manufacture of the swash pump.

FIG. 1 shows three intersecting axes: X1 (axis of rotation of the common drive shaft), X2 (axis of the slanted section of the drive shaft) and X3 (axis of the trunnion bearing 213) about the inner swash sphere. These three axes are all congruent at a single point—the fixed congruent point (fixed relative to the housing of the pump)—inside the slanted section 102A of the drive shaft. Axis X3 as defined is a moving axis though always centred on the fixed congruent point, formed by the side-to-side movement of the trunnion bearing during use as it slides from side to side of the divider plate 104, while held in the axial gap machined into the edge of the swash plate. Alternatively, axis X3 may be defined as the centre of the inner swash sphere. Then, axes X1 and X2 should be congruent with the centre of the inner swash sphere at the fixed congruent point. Alternatively, axis X3 may be replaced by a plane intersecting the centre of the swash plate. Then, axes X1 and X2 should be congruent with the plane intersecting the centre of the swash plate, at the fixed congruent point. Given precise manufacture, any swash pump that maintains this geometrical condition during use will maintain the quality of the moving seal between the swash plate and the cone plates at the two nutating lines of contact between the diametrically opposite swash plate sides 103A and the cone plates 107. The pump will be less efficient if this geometrical condition is not maintained, such as if axial movement of the common drive shaft occurs.

According to our understanding of swash pump design, it is important when constructing a swash pump to ensure that the common drive shaft includes offset and slanted sections so that the slanted section is at the selected angle and that the axis of the straight sections (if produced) precisely intersects the axis of the slanted section at a single point, preferably about midway along the slanted section. Equally, it is important to ensure that the intersection of axes shall coincide with the centre of the inner swash sphere, or, intersection with the axis (if produced) of the trunnion bearing if provided. The latter requirement means that the straight section of the common drive shift should rotate bat a fixed axial position along the axis of the straight section in relation to the housing of the pump which also supports and locates the concave bearings that support the inner swash sphere, and supports and locates the cone plates. As described elsewhere in this example, a deep-groove roller bearing clamped in a predetermined position along the straight section and held within the housing is one way to meet this latter requirement.

This design approach leads to the realisation that it is feasible to manufacture a swash pump, motor or turbine having just two bearings for supporting the common drive shaft. One of these bearings is a compound bearing including the inner swash sphere.

FIG. 1 illustrates the structural principles of the present invention; a swash pump 100. The terminology used herein suits a pump but the principles are also applicable to a turbine or motor. This sectional diagram assumes that a 15 degree slant angle is included as part of the one-piece drive shaft and that cone plate separation takes into account the finite thickness of the swash plate 103A. Housing 101 is a frame to fix the parts in relation to each other during use, and also forms the enclosed pumping chamber 105. The enclosed pumping chamber is centred on the fixed congruent point and defined by the surfaces of the cone plates 107 in contact with the nutatable swash plate 103A, the exposed part of the inner swash sphere 103 in between contacts with the sealing rings 109, 109A and the partial outer swash sphere 106. Pumping chamber 105 encloses a circular swash plate 103A attached to the periphery of the inner swash sphere 103. The sphere 103 includes an axial aperture 103B, perpendicular to the plane of and coaxial with the swash plate, that encloses a slanted section 102A of a common drive shaft 102. The pumping chamber is closed off by a radially oriented divider plate shown in the lower half of the pumping chamber as item 104, that is situated within a sector cut out of the swash plate and occupied by a trunnion bearing as described in relation to FIGS. 2, and 3a. The sphere is supported on bearing means 109, 109A that allows the slanted section of the drive shaft to rotate inside the sphere around axis X2 against bearing means 108 thereby enforcing nutation, since the straight section of the drive shaft is already bound to rotate coaxially inside bearing 110 around axis X1. The outer edge of the swash plate slides against (or may not quite make contact, though sealing against) an inner surface of a partial outer swash sphere 106 inside pumping chamber 105. The cone plates and the outer swash sphere are preferably machined surfaces of the housing but may be inserts.

Minimised Bearing Count; Multi-Purpose Bearings.

In the diagram showing principles in FIG. 1 the drive shaft is supported on only two, multipurpose bearings. These comprise the plain bearing 110, and the compound bearing comprising in combination the concave support surfaces 109 and 109A that slidably support the nutatable inner swash sphere 103, and, inside the inner aperture 103B of the inner swash sphere, the plain or needle roller bearing or bearings that separate the slanted section 102A of the rotatable drive shaft from the nutatable sphere and transmit forces between the two. The visible separation shown in FIG. 1 between 103 and 109 or 109A is for illustrative purposes only. The compound bearing serves a number of functions. These include:

1. Supporting one end of the entire rotatable drive shaft assembly, despite that end of the drive shaft. being slanted at an angle to the axis of rotation.

2. Slidably locating the swash plate and inner swash sphere at the correct position described here as the fixed congruent point within the pump housing.

3. Resisting reaction forces that alternate in direction during each revolution, and are caused by pressures developed within the pump cavity, and transferring those forces to the pump housing. The compound bearing means is also capable of transferring substantially all of the resultant thrust load produced by pressure of the liquid in the pumping chamber through the sliding concave surfaces and on to the housing of the pump or turbine, so that a small part or substantially none of that load is applied to the slanted end of the rotatable drive shaft.

4. Defining and driving the nutating motion of the swash plate, as caused by rotation of the slanted end of the rotatable drive shaft inside the inner swash sphere and as applied to the swash plate mounted radially about the aperture containing the slanted drive shaft upon the inner swash sphere.

Serving as a seal for the inner sphere aspect of the pumping chamber, to both sides of the swash plate. It may be that the liquid being pumped serves as a lubricant as well as a vehicle for the removal of heat from the sliding surfaces. A little leakage is expected to occur between the concave bearings and the inner swash sphere. The amount of leakage through the spherical seal gap will help cool the bearing, as will the nutating motion.

The compound bearing is reliant on an appropriate choice of materials for the spherical surface and for the concave supporting surfaces.

Bearing 110 is shown diagrammatically in FIG. 1 as having an internal aperture partially embedded within the mass of the drive shaft, and an external circumference partially embedded into the pump housing, and having no axial clearance. Details of construction are omitted in order to emphasise the second of the functions described below.

Bearing 110 serves several functions, including

1. Locating the common shaft 102B within the pump housing 101 at an axial position determined by design and implemented during manufacture, so that the drive shaft is not free to move axially and disrupt the situation of congruent axes about the fixed congruent point as described above. In Example 2, this function is assumed by the compound bearing, Bearing A, described below). FIG. 10 shows a solution using a set of thrust washers and a plain sleeve bearing.

2. Holding the drive shaft 102 within the pump housing, concentric with the aperture in which the bearing is mounted, while the drive shaft rotates. This maintains the predetermined tilt axis of the swash plate, which is fixed to the inner swash sphere at the intended angle with respect to the configuration of the pump. A small fraction of the reaction forces from the pump cavity that cause a torque to be applied to the slant shaft will be transferred to this bearing 110 and in turn to the pump housing.

3. Taking up any net force preferably applied symmetrically along axis X4 through the pulley (or other wheel) 111 as a result of a pull from a coupled belt or the like, so that such forces are not transferred along the drive shaft to the compound bearing.

If an integrated motor or dynamo (dynamoelectric machine) is used (see below), this bearing and the compound bearing serve as the complete set of bearings to support the rotatable armature. The conventional bearing 110 is preferably centred symmetrically in relation to axis X4 so that it is in line with any force brought to bear on to the pulley or wheel 111 along axis X4, such as by tension in an attached driving belt, so that no resultant moment is carried along the drive shaft to the bearing 109. It will be noted that the pulley of FIGS. 1 and 2 has a re-entrant or bell shape in section, so that the thrust axis X4 does pass symmetrically through the bearing. A preferred gear pinion, sprocket wheel, rotor, armature, or other wheel would also have a bell shape (see FIG. 4b). This is considered to be a simpler design and one that is far easier to make, than, for example, a design that places a flat wheel in between two bearings supporting the straight section of the drive shaft.

According to this invention, the inner swash sphere assembly, with supporting concave bearing faces, is used as one of two effective bearings for the entire common drive shaft even though one end of the drive shaft terminates in a slanted section within this sphere. The other bearing is journal or ball bearing 110. In FIG. 1, inlet and outlet ports are placed above and below the plane of the section, each side of the divider plate and are not shown, although one is indicated at 301 in FIG. 3a.

A Working Pump—FIG. 2.

An example complete swash pump or turbine for pumping liquids is shown in longitudinal section through the divider plate in FIG. 2. The reader must be aware that this example is non-limiting as to the scope of the invention. The diameter of the swash plate is 110 mm and typical rates of shaft revolution are in the range of 100-1300 per minute. This form of pump has a wider range of effective operating speeds than has a vane pump. FIG. 2 retains the indication numbers of FIG. 1 and identifies further parts.

The single bearing (110 in FIG. 1) is a single deep-groove ball bearing assembly (outer race 201, ball bearings 202 and inner race 203). The inner race is firmly located in position along the shaft by the step 204 which has been machined on to the shaft with close tolerance at a particular axial position. The inner race of the bearing assembly is forced against this step by pressure applied from an extension 205 of the drive wheel 111, which is forced up against the inner race by tightening the cap screw 206 into an axial threaded hole in the shaft, against the load distributing washer 207. The drive wheel is prevented from rotation by for example splines or the key 113. Next, in order to locate the shaft 102 with respect to the pump housing 101, the outer race 201 of the bearing is retained within a closely fitting cylindrical space machined into the housing of the pump by a circlip 208 held inside a radial groove machined so as to hold the bearing in a position that maintains the requirement of congruence of axes at the fixed congruent point. Note also that the balls of this bearing assembly are in line with the centre of the axis of the illustrated V-belt groove 112 in the pulley wheel example 111 shown here. For larger pumps a self-aligning spherical or roller ball bearing assembly may be used at this position. In some applications, a journal type bearing may be used here. No preferred type of bearing allows the drive shaft 102B to move along its axis X1 and thereby breach the congruent axis requirement. Preferred types may allow a little pivotal movement of the shaft about the centre of this bearing of perhaps 1-2 degrees, to take up any distortion without undue friction. In practice, almost no pivotal movement about this bearing occurs because the compound bearing prevents such movement. A shaft oil seal, protecting the lubrication of the single or second bearing, as shown at 209 is made of a "Viton" material or an equivalent as appropriate for the liquids to be pumped. A further circlip 210 is placed adjacent the seal so as to stop that oil seal from inadvertently contacting the single bearing.

In this example the compound bearing is comprised of two concentric parts. Internally, the plain or journal bearing around the slanted drive shaft, 108 is comprised of a pair of cylinders made for instance of the engineering plastics "Fortron" or more preferably a "DU" type bearing, placed at each end of and sliding over a properly machined and hardened steel shaft 102A comprising the slanted section of the drive shaft. Alternatively this bearing might be made of an overmoulding of "Fortron" or an equivalent applied to the slant end of the drive shaft and later machined to a precise diameter so that it will form a neat sliding fit inside a well-finished aperture 103B in the inner swash sphere. An alternative is a pair of needle roller bearings may be used at the same position. If the selected bearings do not inherently allow axial movement, then friction will rise owing to misalignment and the desired congruence may not occur. The spherical bearing 109 that supports the inner swash sphere 103 comprises a pair of concave rings 109, 109A of a suitable material that are machined or otherwise formed to have the correct shape and dimensions and are mounted in circular receptacles formed into the housing of the pump. We have used spheroidal, graphite ("SG") iron for the sphere 103 and an engineering plastics—in particular "Fortron"—for the concave surfaces 109, 109A against which the sphere 103 slides. These bearings may be comprised of a metal ring base overmoulded with "Fortron" and subsequently machined into a suitable size and shape. With this combination no failures have occurred during testing over more than 4000 hours. The relative position of the two materials may be reversed if a plastics-overmoulded swash sphere and swash plate is used. The iron may be replaced by steel or other suitable metals for particular applications. Non-corrodible equivalents to SG iron may be preferred for some applications.

In FIG. 2, a circumferential joint 101A between parts 101 and 101B of the pump housing is shown. Hence all parts can be assembled from separate components.

The divider plate assembly which seals across the circular pumping chambers is shown in detail in FIG. 2. It comprises the divider plate 104 that is held within a slot cavity with the housing, allowing a slight radial movement. A spring 211 compresses the divider plate towards the sphere centre, so that the "Fortron" divider seal 212 having a concave inner face, for sealing against the inner swash sphere, is held in contact. (Note that a version in which the spring is included between the divider plate—which is then fixed—and the plastics seal is preferred). A notch shown as 103C in the isometric exploded view FIG. 3a having circular sides is machined into the swash plate 103A and continues into the inner swash sphere 103 as the locating bore 103C in FIG. 1. A trunnion bearing (seen best in FIG. 3a as 213) resides in the notch. The trunnion 213 slides from side to side over the divider plate 104. All the other components shown in FIG. 3a have been described previously in this section.

Congruence and Manufacturing Accuracy.

We have found that during manufacture sufficient precision should be employed to maintain the "congruent point" congruent to, for example, within a zone of about 0.5 millimeters diameter for a 110 mm diameter swash pump in order to avoid an adverse effect on the efficiency of the pump. In terms of volumes, that ratio is about $1:0.5 \times 10^{-9}$. 0.1 mm congruence is better. Such precision is easily attained with numerically controlled machining equipment if used and maintained by competent workers. This approach provides interchangeable parts, and pumps that do not require individual setting up such as with shims or other by trial adjustments. For example, parts may be machined from solid metal, or cast and then machined, or cast under-sized from metal, coated with an overmoulded plastics, and then machined to a desired tolerance and surface finish.

The FIG. 1 and FIG. 2 diagrams also include an example of one practical driving means. The wheel shown is an offset or bell-shaped pulley 111 mounted by a locking device 113 (key or spline or the like) upon an exposed end of the straight section of the common drive shaft 102 and carrying for example a V-belt groove 112 around the pulley periphery which serves as a means to apply a torque to the wheel. The pulley periphery is preferably positioned upon the common drive shaft in relation to bearing 110 and using the bell shape so that any force resulting from tension applied by the belt (or reaction force derived from a gear drive, motor armature, or the like) is symmetrically applied over the bearing along axis X4 (see FIG. 1), so that there is no resultant moment of force applied along the drive shaft to the compound bearing assembly. Such a moment of force may be tolerated, but adversely affects the life of the pump and raises frictional losses.

Variations

Turbine or Motor Aspects.

Since this device is reversible and may be used as a turbine or engine, driven by pressure of a flowing liquid, the reader should understand that the preceding description that refers mainly to a pump, and mainly uses pump nomenclature, also describes a device capable of providing rotational power arising as a result of forced movement of liquid through what has hitherto been named the pumping chamber, and against the swash plate. The force passes through the inner swash sphere shaft and causes what has hitherto been named the common drive shaft (102-102A) to serve as a driven shaft. As a result, the direct drive brushless motor described later may become a generator or alternator; and is a "dynamoelectric machine". Or, a belt drive may take motive power away from the turbine.

Since the device exhibits a relatively low leakage as backflow, and is reversible, it is useful as an actuator or hydraulic motor for reasonably accurately controlling the rotational or linear position of some object.

Driving Means.

The illustrated "V-belt drive" pulley 111/112 in FIGS. 1 and 2 and 3 is provided by way of example only. V-belt pulleys are used in liquid fuel delivery pumps in forecourt fuel dispensers, to cite the example of one intended application of this pump. Alternative drives include, without limitation, chain drives, other forms of belt such as flat belts, toothed belts, gear drives, and devices that apply a torque directly to a rotor periphery such as water wheels, Pelton wheels, and use of the rotor as a rotor of an electric motor such as a direct drive brushless motor; so that the pump provides an integrated pump and motor; or, an integrated turbine and dynamo.

Integrated Motor, or Integrated Dynamo.

In the cross-sectional diagram in FIG. 4b, the "pulley" is converted into a rotor 111 for a dynamoelectric machine. This sectional view shows one of many possible alternatives to the V-belt pulley of FIGS. 1 and 2. The rotor is shown with permanent magnets 401 attached around the periphery, symmetrically about axis X4, comprising the rotor of an integrated motor or dynamo—(dynamoelectric machine). As shown in the end view diagram of FIG. 4a, 12 magnets may be attached with their alternate poles (N or S) directed-outward and the respective magnetic circuits completed within the rotor, if made of iron or another ferromagnetic material. The entire rotor may be made of a magnetically hard ferrite that has been magnetised at the time of manufacture as one polypolar unit, and may have a circular profile. FIG. 4c shows an end view of an example single ferrite wheel permanently magnetised with a number of poles.

The external stator 402 carries a corresponding set of 6 fixed coil assemblies, one of which is shown as armature 403 also carrying winding 404 to 405 upon a soft ferromagnetic armature as shown in FIG. 4a. During use, the windings are energised in a particular sequence so that the magnets are attracted or repelled, so causing a torque around the axis of rotation. This example is a three-phase arrangement and the coils are wired so that every third coil shares the same drive current. The inter-wiring is not shown in this diagram, and no controller or sequencer is shown. Such arrangements are well known to those skilled in the art. Suitable DC-powered controllers provide variable speed operation, and may offer reverse direction operation as well. The variable speed operation particularly suits certain applications such as in the delivery of liquid fuel from dispensers at a garage forecourt and we have efficiently operated a prototype pump at from 100 to 1300 rpm with a brushless DC motor and controller.

A conventional induction motor rotor could be installed in place of the magnets shown here.

The complete integrated motor and pump takes up less space and needs fewer parts than a side-by-side, belt-coupled motor and pump combination. As an option, the stator could be constructed internal to the magnets, so that secure magnet attachment in order to overcome detachment caused by centripetal force is not so critical. Note that no extra bearings or other moving parts are required in order to equip this swash pump or turbine with an integrated dynamoelectric machine. If the swash pump is instead used as a turbine, the integrated motor described here may be converted into a generator by taking the coil outputs and rectifying them (if required), than transmitting the electric power to a load having a suitably matched impedance.

Peripheral Sealing.

In, relation to sealing the pumping chamber 105, we have found that use of a peripheral sealing ring around the swash plate and against surface 106 is usually not necessary if good precision is maintained during manufacture. It would comprise a source of friction during use, even if the ring is made of "Fortron" or a similar low-friction plastics product and slides against an highly finished iron or steel surface. Any liquid that escapes from one side over the edge of the swash plate 103A finds its way into the second pumping chamber on the other side of the swash plate. A thick swash plate, or at least one with a wide periphery provides a longer leakage path. Sealing about the inner swash sphere is provided by the sliding bearings 109 and 109A which inherently provide a long leakage path and become bedded down during use so that the cross-sectional area of the leakage path stays small. Sealing along the pumping chamber from one side to the other of the divider plate 104 is generally considered to be most critical since the largest pressure differences occur across the plate.

Overmoulding for the Pump/Turbine.

One preferred way to reduce friction and reduce costs in this design is to overmould the swash plate 103A and the swash sphere with a plastics material as shown in FIG. 7. This also overcomes the potential problem of having two like surfaces; the swash plate and each cone plate rubbing against each other, which may result in wear. Nutation of the swash plate inherently includes a small amount of sliding contact with the cone plates, which varies in amplitude depending on the position of the swash plate relative to the divider plate 104. A greater amount of sliding occurs between the inner swash sphere 103 and the supporting rings 109, 109A that form the outer part of the compound bearing.

Overmoulding of an engineering plastic such as "Fortron", PPS or its alloys, or PPA or its alloys is usually preferred. This would slide against metal; for example spheroidal graphite iron or another metal comprising the cone plates and also comprising the concave bearings 109 and 109A. Conduction in the metal would help ensure cooling, although most of the sliding surface is exposed to the liquid being pumped during nutation assisting cooling.

FIG. 7 is an axial cross section of an overmoulded swash plate. The layer of coating plastics material 701 also passes through a set of apertures 702 passing from side to side of the swash plate and optionally also entering keys (not shown) in the sphere surface. The surfaces may be shaped to sufficient accuracy within a mould, or may be subsequently machined to size and/or polished. This swash plate is lighter than a steel version, and the metal skeleton within (103A) retains a desired stiffness. This process is less costly than machining of metal swash plates.

Option Providing Resilience in the Pump/Turbine.

No provision has been made to this point for any resilience in the drive path and in many applications resilience is not an issue. Some liquids to be pumped may contain solid or semisolid lumps, which might interfere with closure of the sealing contact line between the swash plate and the cone plate, or become crushed there. Or, resilience may be used in order to provide a more consistent sealing pressure at the nutating sealing lines, for those applications that require lowest leakage. Hence an option that incorporates resilience may be required so that the swash plate is not forced to crush such a solid, or so that a light sealing pressure can be applied. A preferred way to provide directional resilience involves a flat-sided slant shaft, operating within a modified inner shell of a bearing placed inside the inner swash sphere, as shown in FIG. 5 and FIG. 6. This preferred, directionally resilient, drive mechanism has already been described in detail in the Applicants' co-pending application PCT/NZ2009/00198. This mechanism has the particular advantage that the phase angle of greatest resilience, which is in line or co-planar with the sealing lines formed by the nutating swash plate against the cone plates, is at 90 degrees to the angle at which the reaction force exerted by a liquid under pressure inside the pumping chamber is applied to the swash plate. At that angle this resilient drive mechanism has substantially no resilience. Also, it can use steel springs 506 for a long service life.

In this mechanism, the slant shaft 102A and the associated inner bearing race include parallel, diametrically opposite flats 501 with a smooth finish that are formed along the length of the slant shaft section 102A. To serve as the inner bearing race, a hollow cylinder 504 is fabricated with an internal aperture including parallel, diametrically opposite flats 505, 505B, which have just sufficient clearance, and a suitable finish, to slide over the flats 501 501B, on the slant shaft 102A. The internal aperture also includes spaces 507 (see. FIG. 6) perpendicular to the flats, giving some freedom for shaft 102A to twist while constrained by the flats inside sleeve 504. Sleeve 504 may be a metal shape that is overmoulded with an engineering plastics material, such as "Fortron", for a sliding interface with the interior of the inner swash sphere 103, or may comprise the inner race of the bearing 108 if needle rollers are used 601, and may be hardened for that purpose. The spaces 507 allow selected resilient means placed within to flex and thereby impart a resilient component to the force applied to the sealing lines, while the mating flats transfer the force required to cause nutation.

Preferred resilient means include helical springs inside holes 502, 503 facing opposite directions from within the slant shaft (see FIG. 5). A hole and spring is shown in the cross-section A-A of the coupling, in FIG. 6. FIG. 6 shows the cylinder or inner shell 504, with (for simplicity) four of the needle rollers 601 in contact. The helical compression spring 506 is shown in section, inside aperture 502. The characteristics of the compression springs are selected at the time of manufacture in order to provide the desired amount of contact force for the pump and its application, and are assembled so that a predictable resilient force is applied against the swash plate to cone plate sealing lines, so long as the amount of actual twist is less than that permitted by the spaces 507.

Example 2

This example of the swash pump of the invention is also optimised for pumping liquids and in this case the congruent point (as previously defined) is preserved within a predetermined tolerance by locking the slanted portion of the drive shaft against the inner swash sphere so that the slanted portion can move axially within a small, predetermined amount that is just enough to allow the relevant thrust bearing surfaces to slide. The physical embodiment is intended to serve as an "immersible pump head" that may be fully immersed in a liquid in a storage tank, preferably driven by a long rotating shaft from a motor outside the tank, as shown in FIG. 9. The application is for the removal of liquid fuel from an underground tank at a petrol or gasoline station forecourt. "Pushing" the liquid up and out of the tank prevents the formation of gas bubbles within the liquid and so a subsequent vortex-based air separation device is not required and a meter can measure the volume of delivered liquid accurately.

This Example restricts axial movement of the common drive shaft by means of thrust bearings between the slanted section of the common drive shaft and the inner swash sphere that prevent or at least limit axial movement of the slanted section of the common drive shaft with respect to the inner swash sphere, while the straight section of the common drive shaft is rotatably supported in a plain bearing that does not impede axial motion. This type of pump is shown in detail in the example application, FIG. 8. In this swash pump no ball or roller type bearing assemblies are used. Their lubrication would be difficult to ensure if the pump is immersed in (for example) a hydrocarbon liquid such as diesel, gasoline, JP-4 jet fuel or the like. This should not be understood by the reader as meaning that if the instant invention restricts axial movement by physical means at the inner swash sphere, ball or roller type bearings are simply inapplicable.

FIG. 8 shows, in diagrammatic form, a ground or forecourt surface 800, under which there is an underground storage tank 801 containing a hydrocarbon fuel 802. A delivery pipe 803 carries fuel from within the tank to a dispenser 804, which includes the usual metering means 805 and display means 806 for indicating to a user who has hold of the delivery nozzle 807 how much fuel is being delivered to his receptacle (tank). An appropriate fuel pipe liquid property (flow and/or pressure) may be sensed by sensing means 808, and information from the sensing means is used by controller 809 (which preferably includes all relevant safety shutdown measures) in order to drive the motor 810 that turns the extended shaft 811 which rotates the impellor (in this Example, the swash plate) of the pump 813. The pump is held low down in the tank 801 at a fixed position by support 812. The motor, hose and support may be constructed on a standard cover such as a manhole cover 815. In this case, the inlet ports 814 of the swash pump are open to the tank; perhaps protected by a gauze strainer while the outlet ports are both joined to the commencement of pipe 803.

One way to control the motor is a "fixed torque mode". In a first, no-delivery state, the pump is always turned slowly, so that internal leakage around the swash plate is supplied and a pressure is maintained in the pipe 803. The torque required to turn the shaft at that rate is sensed in terms of coil currents. If the system enters a second or delivery state, when liquid starts to flow within the pipe, the pressure will drop, the pump sees a lower load, the torque drops, and so the pump will turn faster in order to maintain the constant torque. A fixed torque mode can be set up easily, by determining preferably two or more fixed points for torque (as sensed in terms of current draw) in relation to flow and entering those into the controller memory (or as potentiometer settings). One recommended safety measure is create a third, dangerous state to exist if the pipe 803 is somehow broken and fuel is passing through the pipe but not through the meter 806 of the dispenser 804. In this example, the meter is used as a flow transducer. An output from the meter 805 may be connected to the motor controller. If there is any discrepancy between meter flow and pump revolutions, the third state may be assumed to exist and the pump should be shut down immediately and an operator should be summoned.

This third state may also arise in the case of theft of fuel by taking it from the pipe somewhere before the meter. Although the diagram shows one immersed pump with one dispenser, one pump may supply several dual-nozzle dispensers if suitably controlled and the rate of output from all the meters should be summed, either digitally or by analogue means, in order to derive a value that should correspond with pump delivery. This control means does not require a separate sensor 808 of pipe flow, since it uses the pump torque, backed up by the delivered volume, as inputs.

The extended shaft 811 is preferably comprised of a tube rather than a rod in order to save on materials and weight for a given diameter and is preferably sufficiently stiff to rotate without developing any harmonic vibration (whirling) at rates of typically at least 1500 revolutions per minute. At the pump end, the coupling from the extended shaft to the common drive shaft is preferably a flexible coupling, a dog clutch, a splined coupling or the like, that allows axial relative movement but transmits rotating movement. For maintenance, the plug or cover 815 bearing the pump and its driving means may be removed as a unit.

FIG. 9 shows a diagrammatic cross section of the central part of the swash pump in the drawing of FIG. 8. The extended shaft 811 is at the right; the pump housing (of which the axial part only is shown here) is 101, the inner part of the swash plate is 103A and the inner swash sphere is 103. The common drive shaft 102B has a slanted section 102A and a straight section 102, which is turned as one unit, when in use, by coupling 901. In this version, bearing 902 is a plain journal bearing having no capacity to withstand axial loads, and so the shaft may move axially against it, with respect to the housing 101. In this pump, it is the slanted section 102A of the common drive shaft is prevented from axial motion within the inner swash sphere 103. In this non-limiting Example, the slanted shaft 102A is provided with a step 903 at the end near the oblique section. This step slides against a thrust bearing 904 which in turn slides or rests against an inward step 905 in the axial bore 108, preferably machined into the inner swash sphere 103. A corresponding step 909 is provided at the other end of the aperture. Journal bearings 108 (dual headed pointer) support radial loads between the rotatable slanted portion 102A of the common drive shaft against the inner swash sphere 103, thereby enforcing nutation, since the inner swash sphere is slidably held against the ring bearings here identified as 109 and 109A; in turn mounted on the housing of the pump 101. At the free end of the slant shaft, a bolt 906 firmly holds a thick washer 907 on to the end of the slanted shaft, which shaft has sufficient length to ensure that when the washer 907 is tight, there is a fraction of a millimeter clearance for the thrust washer 904, and the thrust washer 908 to slide and allow the drive shaft to turn inside the aperture, but not so much clearance as to allow axial movement of the slanted section 102A to cause the congruent point condition to be destroyed.

It should be noted that this version of pump is in no way limited to immersed operation, although such a situation particularly lends itself to use of plain or "DU" type bearings throughout.

The immersed pump may be used in cryogenic applications, such as in the withdrawal of liquid nitrogen, liquid oxygen, or liquid hydrogen from a tank, where one particular advantage is that by not placing the liquid under suction, it is not encouraged to boil inside the intake pipe. Gases stored as very cold liquids inside thermally insulated tanks usually exist at or near their boiling points. In rockets, for instance, a reliable and consistent supply of fuel to the engines must be maintained.

FIG. 10 is a cross-sectional diagram showing part of a swash pump—"bearing means B"—a plain sleeve-type journal bearing 1005 around and supporting the straight section 102 of the common drive shaft against the housing 101. The bearing assembly includes a set of thrust washers (1004 and 1006) and bearing surfaces (step 104; collar 1001 against retaining circlip 1002 held in groove 1003) that together have the effect of preventing uncontrolled axial movement of the straight section relative to the housing 101, according to the principles of the invention. This drawing and FIG. 9 are examples showing that either bearing on the common drive shaft may be provided with means to prevent axial motion. It is likely that if both bearings are provided with means to prevent axial motion, individual surfaces may be inadvertently pressed against each other if the overall manufacturing accuracy is not significantly greater than the amount of axial play allowed in any one bearing. FIG. 10 is a hybrid between Examples 1 and 2, in that it fixes the axial position of the journal bearing 110 Bearing B; as in Example 1, while it illustrates use of a type of bearing that may be soaked in gasoline or another liquid, without a requirement for sealing the bearing and lubricants within. Unlike the deep-groove roller bearing, this type of bearing allows relatively little deviation of the shaft from the normal axis shown by the dot-dashed line.

INDUSTRIAL APPLICABILITY AND ADVANTAGES

1. A swash pump, turbine or hydraulic motor according to the invention is simple to make and maintain, since the bearing count has been reduced to a minimum.
2. The parts cost is reduced since each bearing serves more than one function.
3. The frictional load is reduced since only two bearing units are included, and no instance where bearings inadvertently work against each other is possible. The pump exhibits between 10% and 50% reduction of power consumption as compared to a vane pump.
4. Bearing load is minimised, and efficiency is raised, by not allowing axial motion of the common drive shaft.
5. The noise level is less than for pumps now used in similar applications.
6. The suction pressure (or capability of lifting a fluid against gravity) is greater than for pumps now used in similar applications
7. The device is capable of incorporating a motor/dynamo as an integrated unit. In that case the same two bearings are used in the integrated unit. The motor may be a variable-speed, brushless motor.
8. In a fuel-delivery application, the pump is capable of operation over a wide range of speeds and hence delivery rates (for example from 0 to 165 liters per minute) so that the same pump may be used to fill an automobile tank, or a truck tank, at an acceptable rate of delivery. It has been observed that when this swash pump is coupled with an "OIML" air separation device within a fuel dispenser, air separation is better than 99.5% over that entire range
9. Incorporation of directional resilient means within the inner swash sphere and about the slanted section of the drive shaft enhances the above advantages.
10. No one-way valves are needed (at least in the intended application) since the sealing lines themselves provide a continuously present seal between the inlet and the outlet at almost all angles of nutation, and so the device is inherently reversible.
11. The reversible liquids pumping capability allows the pump to be used inside aircraft to pump fuel between fuel tanks in order to control balance, and in submarines, to control buoyancy, for two examples.
12. The pump is inherently scaleable, including applications in organ replacement.
13. The pump may be constructed with sliding bearings (example: DU type) alone, and operated in conditions where oil or grease type lubricants would be leached out.
14. The immersed pump is suitable for extracting liquids from tanks without imposing negative pressure, as would occur if a remote pump applied suction to an inlet pipe.

Finally, it will be understood that the scope of this invention as described by way of example and/or illustrated herein is not limited to the specified embodiments. Where in the foregoing description, reference has been made to specific components or integers of the invention having known equivalents, then such equivalents are included as if individually set forth. Those of skill will appreciate that various modifications, additions, known equivalents, and substitutions are possible without departing from the scope and spirit of the invention as set forth in the following claims.

We claim:
1. A swash pump or turbine comprising:
an inner swash sphere with an annular swash plate attached thereto and with a central aperture, the swash plate being contained within an enclosed pumping chamber enclosed on each side by a fixed cone plate having the shape of a shallow cone, enclosed outwardly by the internal surface of a fixed, partial external swash sphere attached to or forming part of a housing of the swash pump or turbine, and enclosed inwardly by the inner swash sphere;

the inner swash sphere being arranged to move in a nutating manner by rotation of a slanted section of a rotatable common drive shaft inside the central aperture of the inner swash sphere, the common drive shaft having a straight section that turns or is turned by an attached wheel, the inner swash sphere thereby being constrained, when the common drive shaft rotates, to move with a nutating motion while maintaining moving sealing lines between the swash plate and the cone plates;

wherein the common drive shaft of the swash pump or turbine is entirely supported by two bearings comprising (A) a compound bearing supporting the swash plate, said compound bearing having an outer part comprising the outer surface of the inner swash sphere slidably supported upon two concave part-spherical bearings that are in turn supported against the housing of the swash pump or turbine, together with an inner part comprising a journalled bearing within the central aperture of the inner swash sphere, supporting the slanted section of the drive shaft, and (B) a single bearing supporting the straight section of the common drive shaft against the housing.

2. The swash pump or turbine as claimed in claim 1, wherein one of bearing (A) or bearing (B) maintains the common drive shaft in a controlled axial position relative to the housing of the swash pump or turbine in order that a state of congruence is maintained at a congruent point where the axis of rotation of the straight section of the common drive shaft and the axis of rotation of the slanted section of the common drive shaft meet at the center of the inner swash sphere, so that loads placed upon the bearings are minimized and so that parallel alignment of the swash plate against the adjoining cone plates at the moving sealing lines is maintained.

3. The swash pump or turbine as claimed in claim 2, wherein the bearing (B) is selected from a range including a deep-groove ball bearing assembly, a self-aligning spherical roller or ball bearing assembly, and a plain journal bearing combined with thrust washers preventing axial movements; said bearing (B) being fixed within the housing of the swash pump and fixed to the straight section of the common drive shaft, and maintaining the common drive shaft in a controlled axial position relative to the housing of the swash pump or turbine in order that a state of congruence at the congruent point is maintained.

4. The swash pump or turbine as claimed in claim 2, wherein the journalled bearing included in the compound bearing (A) is also provided with thrust bearings allowing only a limited axial movement of the slanted section of the drive shaft with respect to the inner swash sphere to maintain the common drive shaft in a controlled axial position relative to the housing of the swash pump or turbine in order that a state of congruence at the congruent point is maintained.

5. The swash pump or turbine as claimed in claim 1, wherein the outer part of the compound bearing (A) serves also as a sliding seal that seals around the inner aspect of the pumping chamber despite nutating motion of the inner swash sphere against the two concave part-spherical bearings.

6. The swash pump or turbine as claimed in claim 5, wherein the outer part of the compound bearing (A) has a first bearing surface comprised of a selected metal, selected from a range including spheroidal graphite iron, grey iron, steel and anodized aluminum, slidable against a second, conforming surface of a selected engineering plastics material.

7. The swash pump or turbine as claimed in claim 1, wherein rotation of the straight section of the common drive shaft relative to the housing of the swash pump or turbine is caused by or causes a torque to be transferred from or to a wheel fixedly attached by a hub to the straight section of the common drive shaft and having a wheel, sprocket wheel, pulley, or cog having a peripheral for transmitting or receiving a torque;

the wheel, sprocket wheel, pulley, or cog having in cross section a depressed center or bell shape wherein said wheel, sprocket wheel, pulley, or cog is displaced axially from the hub.

8. The swash pump or turbine as claimed in claim 7, wherein the rim of the wheel is provided with an array of alternating magnetic poles, a magnetic flux from each pole being directed through at least one adjacent wound coil mounted upon a stator thereby comprising a motor or a dynamo; the combination of the swash pump with the motor or dynamo comprising an integrated, electrically driven swash pump or turbine having only two bearings, namely a compound bearing and a single bearing supporting a common drive shaft; the straight section of which also comprises a supported shaft of the motor or dynamo.

9. The swash pump or turbine as claimed in claim 1, wherein the inner swash sphere includes an internal frame, coated with a moldable plastic material having acceptable friction and wear characteristics, machined to prescribed dimensions and finish.

10. The swash pump or turbine as claimed in claim 2, wherein the swash pump or turbine is an immersible pump mounted upon a fixed support and having a plain journal bearing supporting the straight section of the common drive shaft, a plain journal bearing together with axially defining thrust bearings supporting the slanted section of the common drive shaft, and a coupler engaging an axial, rotatable drive shaft.

* * * * *